Patented Dec. 13, 1938

2,139,724

UNITED STATES PATENT OFFICE 2,139,724

MANUFACTURE OF RUBBER ARTICLES AND COMPOSITIONS THEREFOR

Joseph Herbert Coffey, Rhos-on-Sea, North Wales

No Drawing. Application November 19, 1935, Serial No. 50,567. In Great Britain November 24, 1934

2 Claims. (Cl. 106—23)

This application is a continuation in part of U. S. patent application No. 8687.

This invention relates to improvements in the manufacture of rubber articles and compositions therefor. It is remarkable that in the classical method of manufacturing rubber articles the original liquid, latex, is first coagulated to form a solid and then, at the rubber factory, prior to and after the incorporation of compounding and vulcanizing ingredients repeated treatment is necessary by heat and mechanical working in order to shape the tough mass into its final form. This treatment involves the use of expensive machinery and much expenditure of power.

It is not surprising therefore, that efforts have been made to manufacture rubber goods direct from latex, but hitherto great difficulty has been experienced, especially in the production of mixes containing the usual high proportions of compounding ingredients, whether of the type that may be classed as inert and mineral powders such as form the bulk of the material used for compounding raw rubber, for example, carbon black or gas black, zinc oxide, whiting, sulphur (for vulcanization), many of the accelerators or catalyzers for speeding up vulcanization, pigments for colouring and natural and artificial fibres for specific requirements. Although it is practicable to preserve latex with ammonia, and to stabilize concentrated latex by protective colloids against spontaneous coagulation, it is well recognized that the addition of really large quantities of dry powders usually effects premature coagulation. In fact, it is recognized good practice to add any mineral fillers in the form of an aqueous dispersion, preferably obtained by long-continued grinding of the powder in water. Accordingly, the main methods of working up latex have consisted in the application of electrophoretic processes or in pouring, spraying or dipping or methods involving the use of delayed action coagulants, to form gels or granular precipitates. It has also been proposed to form thixotropic compositions which can thicken the latex to assume the gel form but can be converted into a liquid form by agitation or in other ways so as to be capable of application by dipping, spraying, pouring, or spreading such liquid.

I may add that it has also been proposed to mix the concentrated latex sold under the registered trade-mark "Revertex", prepared with a stabilizer, with dehydrating ingredients such as cement but I find that these mixtures coagulate when substantial quantities of dry compounding ingredients are added.

I have now found that it is possible to prepare a variety of rubber mixes containing large proportions of the usual compounding ingredients, inert fillers and/or ground vulcanized rubber, having a mechanically workable consistency which may be described as resembling that of putty in its ease of manipulation; the product may also be described as stiff but plastic and formable; the rubber is not coagulated and the mixture is quite different from either a gel or a gelatinous precipitate capable of agglomeration or a thixotropic composition capable of liquefaction or a thin paste which can be spread by a trowel as a cement. This product can then be moulded or otherwise shaped and fabricated into articles in the same manner as the usual masticated and warmed raw rubber material is mechanically treated although with much less expenditure of power.

The invention therefore consists firstly in a massively stabilized rubber composition having the above-described physical characteristics and preferably containing about 10 to 20% of water (calculated on the dry residue, by weight), and further in the manufacture of rubber articles by rolling, extruding, stamping or similar operations (including any operations applicable to the well-known masticated and warmed raw rubber material), applied to a mechanically workable mixture of a massively stabilized latex or like rubber dispersion, with relatively large quantities of solid compounding agents. The composition may be prepared from an artificial or natural dispersion of rubber or by grinding or mixing raw rubber powder or pulverized vulcanized rubber with a hydrophilic colloid such as Dixie clay either in the presence of water or in some cases of a rubber solvent, in which latter case the colloid reduces tackiness and gives the desired formable puttylike mass.

The invention further consists in such compositions containing substantial additions of solid rubber (either vulcanized or not) such as ground vulcanized rubber, ebonite dust or raw rubber powder, which can be added in quantities to give the precise type and quality of a mix for specific purposes and to give the desired consistency for working in the manner described.

This difficulty is overcome by the addition to the mix of powdered raw rubber or ground soft vulcanized rubber.

In the preferred process, having determined the type of mix desired, the latex is poured into the stirring vessel, the stabilizers added, and then the dry powders and vulcanized ingredients are incorporated; afterwards the mix which has noticeably thickened, though still pourable, is passed through a paint mill to ensure adequate dispersion of the dry ingredients, and thence the mix is transferred to an enclosed paddle mixer where the powdered raw rubber, ground vulcanized rubber, or ebonite dust is mixed uniformly to a homogeneous mass.

The resultant rubber mix will usually have a water content of between 10 and 20 per cent calculated on the dry content of the mix.

Such a mix is definitely not pourable but can be formed, shaped or moulded under moderate pressure by hand or by mechanical methods.

During the mixing process the mass is stable and free from coagulated rubber and will remain in this condition awaiting further processing. The composition after being pressed or formed to produce the desired article will coagulate and retain the form and design imparted.

The moulds or formers may be porous or non-porous and the articles may be dried and vulcanized in situ or removed from the moulds or formers, dried and then vulcanized under pressure by any suitable means.

By the term "massively stabilized" I refer to mix containing such, or such quantities of stabilizers that the mix is not only prevented from spontaneous coagulation or coagulation by addition of small quantities of dry fillers, but that it is so stabilized that large quantities (preferably in amounts equal to or greater than that of the rubber content of the latex) of dry fillers or ingredients (usually including finely divided solid rubber) can be added without coagulation.

Suitable massive stabilizers are clays such as Dixie clay and dextrin, glue or corn starch or aluminium hydroxide or other hydrophilic colloids.

Some of these ingredients are known additions to rubber mixes for other purposes than those contemplated by the present invention.

Alternatively caustic alkali or oleates or other strong stabilizers may be added to the latex, in some cases the commercial stabilized latex may be suitable for the purpose without further stabilization.

The compounding ingredients may consist of the stabilizers and any of the usual components of a rubber mix, together with vulcanizing agents and powdered rubber, or ground vulcanized rubber or ebonite dust with or without softeners.

I have found in latex compounding that the addition of ingredients such as zinc oxide, lithopone, carbon black, whiting, etc., whether added dry or in the form of dispersions have a pronounced deleterious effect on the product of the mix, and tend to destroy the rubbery feel that is desirable.

If it is attempted to obtain mixings containing from 10-20% of water (calculated on dry ingredients) without the precautions above indicated, the mass becomes so stiff that complete incorporation of the fillers is impracticable.

The invention may be illustrated by the following examples in which clay has been used as a preferred ingredient. It may be replaced by other massive stabilizers, especially when the latex is stabilized by caustic. These examples illustrate the use of some different types of added rubber. In some cases the addition of raw or vulcanized rubber need not be made.

*Example 1*

| | |
|---|---|
| Revertex (registered trade-mark) | 130 |
| Aluminium hydroxide | 10 |
| Dixie clay (registered trade-mark) | 10 |
| Zinc oxide | 5 |
| Sulphur | 2 |
| Zimate | 0.5 |
| Medium machinery oil | 20 |
| Ground solid tires 26s mesh | 180 |

*Example 2*

| | |
|---|---|
| Revertex | 520 |
| Aluminium hydroxide | 40 |
| McNamee clay | 160 |
| Sulphur | 8 |
| Zinc oxide | 20 |
| Finely ground vulcanized tire tube | 294 |
| Altax, accelerator | 3 |
| D. O. T. G., accelerator | 4 |

*Example 3*

| | |
|---|---|
| Revertex | 260 |
| Sulphur | 100 |
| Dixie clay | 40 |
| Alum. hydroxide | 20 |
| Ebonite dust | 140 |

*Example 4*

| | |
|---|---|
| 60% concentrated latex (Jatex R. T. M.) | 100 |
| Caustic soda | 1 |
| Potassium oleate | 2 |
| Dixie clay | 25 |
| Zinc oxide | 5 |
| Sulphur | 2 |
| Zimate | .5 |
| Cadmium sulphide (colour) | 1 |
| Powdered raw rubber | 100 |

In the above examples the numbers referred to indicate parts by weight.

In manufacturing the mixes the massive stabilizers can be dispersed in the latex before or after concentration. In some cases it may be necessary to add water if concentrated latex is used.

A wide range of fillers may be employed, including fibrous materials. It may be desirable to eliminate or reduce voids by grading the particle size, for example by using a mixture of ground rubber passing a 20 mesh sieve with ground rubber passing a 60 mesh sieve.

As above stated, the formable composition may also be made without using latex, e. g. by incorporating hard rubber dust or vulcanized or raw rubber powder with Dixie clay or the like in water or even in an organic liquid, to form a product having a suitable physical consistency.

These mixes can be prepared in a ball or grinding mill, first of all grinding the massive stabilizer into the latex the moisture content of which will be determined by the amount of added ingredients planned or if concentrated latex is used, water may be added so as to obtain the desired consistency which will be reasonably uniform for moulding purposes.

The lightness of the equipment and ease of working inert plastic material will effect tremendous economies in time, capital expenditure, power and labour, by comparison with existing practice. Instead of calendering the mixed stock on to fabric or in sheet form, the mix will be spread by a light weight roller, as against the warming by mastication and calendering through multiple rolls heavily geared as at present. Drying may be effected before or during vulcanization. Porous moulds may be employed, if desired, especially when coagulation occurs under pressure. Processing and process methods will more approximate the ceramic industry than the existing methods of the moulded rubber industry, which now closely parallels the steel industry in fabrication of products after the billet stage is reached.

I declare that what I claim is:—

1. A process of preparing an uncoagulated, readily-able unmasticated non-agglomerated rubber compound which comprises the mixing of a concentrated aqueous dispersion of substantially fibre-free rubber, dry powdered filler, a vulcanizing ingredient, powdered solid rubber, adapted to pass through a 20-mesh sieve, and in part through a 60-mesh sieve, and a stabilizer, the filler and stabilizer being first thoroughly mixed with the said dispersion and the solid rubber subsequently lightly stirred in in sufficient quantity to reduce the proportion of water content to solids enough to produce a putty-like mass, non-coagulable on standing but coagulable by pressure.

2. A putty-like moldable, uncoagulated unmasticated non-agglomerated rubber composition which contains less than 20% of water and comprises an uncoagulated aqueous dispersion of substantially fibre-free rubber, a filler, a vulcanizing ingredient, a stabilizer, and powdered solid rubber, adapted to pass through a 20-mesh sieve, and in part through a 60-mesh sieve, the composition being coagulable by pressure but capable of standing without coagulating.

JOSEPH HERBERT COFFEY.